Nov. 17, 1959 R. H. COLEMAN ET AL 2,913,118
FILTER APPARATUS
Filed Feb. 15, 1957
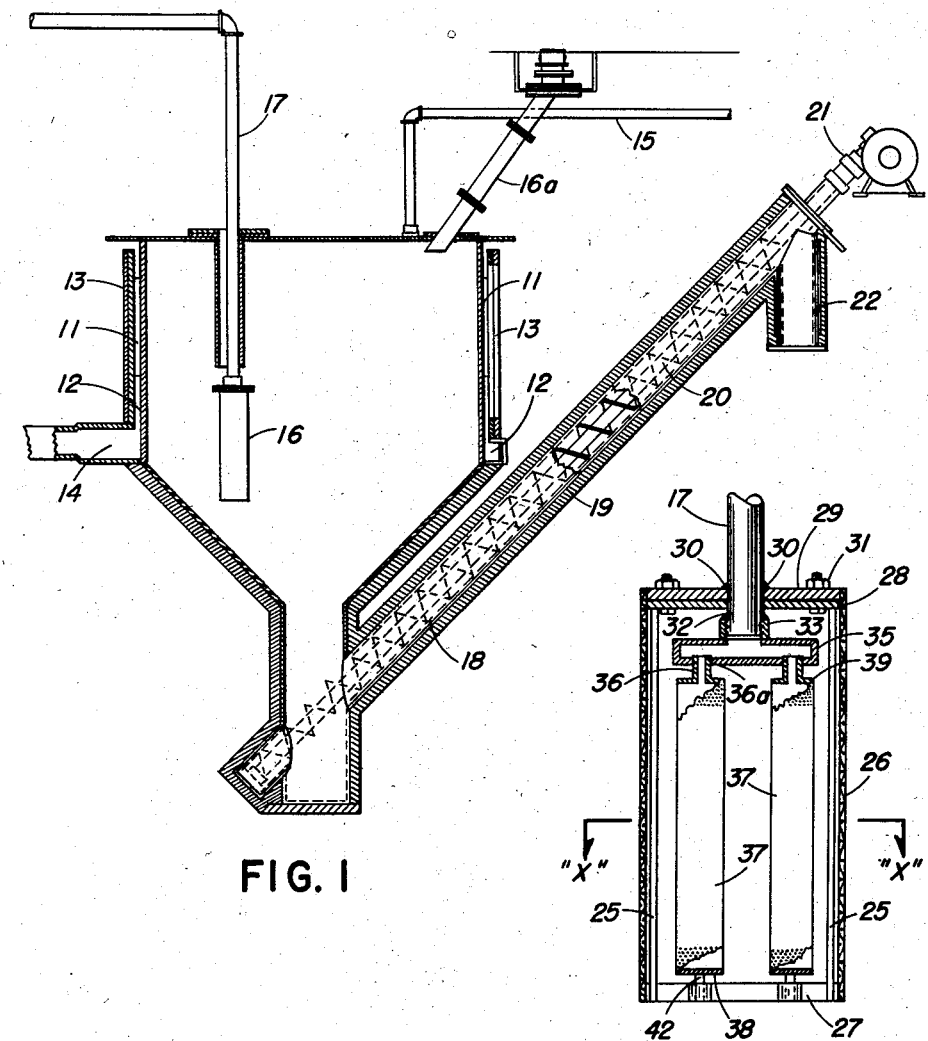
FIG. I
FIG. II
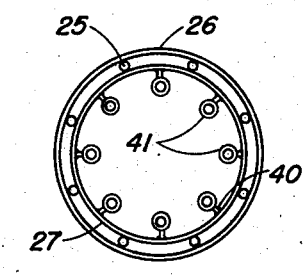
FIG. III
ROBERT H. COLEMAN
EDWARD R. TOTH, Jr.
*INVENTORS*

United States Patent Office 2,913,118
Patented Nov. 17, 1959

2,913,118

FILTER APPARATUS

Robert H. Coleman and Edward R. Toth, Jr., Ashtabula, Ohio, assignors to National Distillers and Chemical Corporation, New York, N.Y., a corporation of Virginia Application February 15, 1957, Serial No. 640,515

4 Claims. (Cl. 210—315)

The present invention relates to a novel filter apparatus adapted for purification of molten light metals and, particularly alkali metals including crude electrolytic sodium containing sludge-forming impurities.

In the production of light metals, illustrative of which is sodium, by electrolytic decomposition of a fused mixture of a sodium salt (e.g., sodium chloride) and a calcium salt (e.g., calcium chloride), the crude electrolytic sodium thus produced normally contains sludge-forming impurities, such impurities generally being calcium, oxides of sodium and calcium, chlorides of calcium and sodium, nitrides of calcium, etc. For production of commercially acceptable sodium, it is generally necessary to substantially remove such impurities from the crude electrolytic sodium. To effect such purification, resort is made to filtering the molten crude electrolytic sodium to remove sludge-forming impurities that are infusible at the melting point of the metal (e.g., sodium) to be purified and, for filtration of such metals that are highly reactive, the filtration is carried out in an inert atmosphere to prevent oxidation and minimize or obviate hazards attendant to the handling of sodium under other than inert conditions.

It is the primary object of this invention to provide an improved filter apparatus for purification of molten light metals.

For use in such purification of light metals, the filter apparatus embodied herein comprises a cage-like primary filter means, usually in the form of a substantially tubular vertically elongated member having appropriate openings for filtering impurities from a crude liquid metal forced through said openings and into the interior of said tubular member, said cage-like means having one end portion closed and the other end open. Disposed inside of said cage-like means, spaced away from the inner wall surface thereof, is a secondary filter element, adapted to filter out impurities that have passed through the cage-like primary filter means. Such secondary filter element is characterized by a closed bottom portion disposed inside the end portion of the cage-like means having the open end and an opposite end portion, disposed inside of the closed end portion of said cage-like means, that has an opening from which purified liquid metal that enters the interior of said secondary filter is withdrawn.

In specific embodiment, the filter apparatus comprises a vertically elongated means comprising a multiplicity of vertically disposed substantially circumferentially spaced-apart supports, the outside of which is covered with a primary filter means such as wire mesh or gauze with the bottom of said primary filter being open and the top end closed with suitable means such as a metal cover plate. Disposed inside of said primary filter are a plurality of vertically disposed, spaced-apart secondary filter means, each of which comprises a tubular, oval, or the like, member having a closed bottom and an opening in the top with a filter surface in-between said closed bottom and top adapted to filter impurities from the liquid metal that has passed through the primary filter whereby purified liquid metal passes into the interior of said secondary filter means. Such an apparatus is further provided with means adapted for withdrawal, from the secondary filter means, of purified liquid metal that has passed into the interior thereof. For such an apparatus utilizing a multiplicity of secondary filter means, a common manifold is disposed inside of the upper portion of the primary filter in open communication with the opening in the top portion of said secondary filter means to provide for passage from said secondary filter means of purified liquid metal into the common manifold for transport of said purified metal to a suitable receiver therefor.

Thus, for use in filtration of a crude molten light metal, there is provided a combination apparatus comprising a vessel adapted to contain such a crude molten metal, means for introducing said molten metal into said vessel and means to maintain molten the metal in said vessel, means adapted to introduce an inert gas into said vessel, means disposed at the bottom portion of said vessel adapted to withdraw from said vessel sludge that settles to the bottom of the vessel, a filter element or plurality thereof as embodied herein suspended inside of said vessel and adapted to filter crude molten metal introduced into said vessel, and means for withdrawing purified liquid metal from said filter means.

In order to further illustrate the invention, an embodiment thereof is described with reference to the accompanying drawings in which Fig. I is a view, partly in section, of a combination apparatus useful for purification of a liquid light metal; Fig. II is a view, partly in section, of a filter element such as is embodied herein and useful in the combination apparatus of Fig. I, and Fig. III is a view, partly in section, of the bottom portion of the primary filter portion of a filter apparatus as embodied herein.

In the drawings, there is shown in Fig. I a metal tank 10 provided with suitable heating elements 11, cooling flues 12, lagging 13, pipe 14 as an inlet for cooling air which feeds to the flues 12 around tank 10, conduit 15 as an inlet for a suitable inert gas (e.g., nitrogen), and conduit 16a as an inlet for the impure metal to be purified. Suspended inside of the tank 10, as shown, is a filter element 16, described more fully hereinafter, said element being connected, as also described hereinafter, by means of conduit 17 to a suitable receiver (not shown) for receipt of purified metal withdrawn from filter element 16. A large pipe 18, covered with lagging 19, is connected with the bottom of tank 10 and slopes upwardly, such as at an angle of about 45°. Pipe 18 is fitted with a screw conveyor 20 which is adapted to be powered at 21 by suitable means and discharge pipe 22 connected near the upper end of pipe 18 at a point above the intended level of liquid in tank 10.

The filter element, as embodied herein and designated as filter 16 in Fig. I, is more fully described with reference to Figs. II and III of the drawings. In Fig. II, there is shown a filter comprising a plurality of circumferentially disposed vertically spaced-apart metal support rods 25, the bottom of each of which is welded, or otherwise rigidly attached, to the outside of a bottom metal ring 27 (more clearly shown in Fig. III) with the top of each support rod being similarly attached to a metal plate 28 provided with an opening for conduit 17. The outside of the support rods are covered with a suitable metallic screen, such as an expanded metal screen of from about ½ to ¾" openings to provide a primary filter. The top of the filter is bolted, as by bolts 31, to a suitable flat steel plate 29 provided with an opening to accommodate a conduit 17 (as also shown in Fig. I). Threaded end portion 32 of conduit 17 engages accommodating threads on a coupling 33 welded to a manifold 35. Manifold 35 is provided with an opening to support a filter unit 37, or a plurality of openings to accommodate a plurality of such units disposed in vertically spaced-apart relationship inside of the primary filter. As shown, filter unit 37 has a closed bottom 38 and a closed top 39 provided with a conduit 36 in open communication with the interior of filter 37, said filter 37 being preferably an oval member comprised of a porous stainless steel outer wall surface adapted to filter out particles in the range of 3–5 microns or more. The filter 37 is supported by a threaded portion on the external top portion of conduit 36 engaged by an appropriate threaded portion in the opening in manifold 35.

As is shown in Fig. III, taken on line X—X of Fig. II in which a showing of filter unit or units 37 has been eliminated, bottom ring 27 can be provided with a series of metal arms 40 secured (as by welds) to ring 27.

Each of such arms 40 is provided with a vertical opening 41 to accommodate and aid to support the vertical, spaced-apart alignment of filter units 37. For such a purpose, each filter element 37 is provided with a rod-like means 42 (Fig. II) vertically disposed with respect to and rigidly secured to the bottom of filter units 37 whereby the rod-like means 42 are accommodated by openings 41 in arms 40. Thus, in the use of a multiplicity of filter units 37, there is provided a corresponding opening in the manifold to accommodate conduit 36 at the top of each filter unit 37 as well as a corresponding arm 40 to accommodate the rod-like means at the bottom of filter units 37 and maintain the vertical, spaced-apart alignment of each such unit.

In an operation for purification of a light metal, illustrated by use of crude electrolytic sodium containing about 0.3–0.8 weight percent calcium, the operation may be carried out as follows utilizing the apparatus shown in the drawings.

The apparatus is first filled with an inert gas (e.g., nitrogen) introduced through conduit 15 and crude molten metal is fed to tank 10 by means of conduit 16a to maintain a liquid metal surface level above the top of filter element 16 and the temperature of the molten metal in the tank is maintained above the melting point of sodium and, specifically, at about 100–120° C. by appropriately controlling the rate of cooling air flow through pipe 14, flues 12 and heating elements 11. Partial vacuum is applied to conduit 17 (or upon the receiver into which conduit 17 empties) whereby the crude sodium fed into tank 10 is drawn through the filter element 16 and exits from the interior of the secondary filter units into conduit 17 and thence into a suitable receiver. During the filtration, impurities settle to the bottom of tank 10 and, either continuously or intermittently, conveyor 20 is operated to carry off the settled impurities, sludge, etc. As the conveyor is operated at a suitable speed, the sludge is elevated outward and upward to the discharge pipe 22 while a substantial amount of the liquid drains back into the tank.

In such an operation, using a filter element as illustrated in Figs. II and III, the crude electrolytic sodium passed into tank 10 initially passes through the primary guard screen of heavy expanded metal 26 which serves to prevent coarse lumps of sludge from passing into the interior of the filter element, thus preventing deleterious sealing of the effective filtering area of the filter units disposed inside of the primary filters. Thus, the sodium from which such coarse lumps of sludge have been removed is drawn through the porous metal filtering surface of filter units 37, said filtering surfaces being, preferably, porous stainless steel that filters out particles as small as from about 3 to about 5 or more microns in size. The resulting purified sodium that passes into the interior of filter units 37 is drawn through conduit 36 into common manifold 35 and thence through conduit 17 into a receiver for purified sodium in which the impurity content has been reduced to less than 0.04 weight percent.

In such an operation, mainly due to the open bottom of the primary filter in element 16, sludge that passes through the expanded metal screen 26 as well as sludge that is filtered by the porous metal filtering surface of units 37 settles out to the bottom of tank 10 and, hence, is not trapped in the filter element itself as is the sludge in heretofore employed closed-bottom filters for light metals such as sodium. Thus, by use of apparatus as embodied herein, it has been found that the open bottom allows the sludge to drain out freely resulting in a markedly extended filter life. Additionally, use of such apparatus results in a marked advantage in that, when it is necessary to remove the filter apparatus, hot sodium can be allowed to drain off substantially completely before the units are pulled out of the tank into the open air, thereby minimizing or obviating hazards as aforediscussed and obviating substantial losses of sodium.

Additionally, and as compared to heretofore employed filters as described in U.S. Patent No. 1,943,307 wherein a plurality of concentric layers of varying size metal screen and gauze is used for the filtering surface, the invention herein enables the sole use of a heavy metal gauze for the primary filter so that, when rodding is necessary to remove filter cake from the metal gauze, the rodding can be carried out with minimization of puncturing or tearing of the primary filter surface. Thus, necessity for frequent filter changes is materially reduced. Still other advantages are that, as compared to heretofore employed filters wherein the filter area is limited to the outer surface of a cylinder, the present invention enables use of a multiplicity of more effective filtering surfaces (units 37) whereby there is made available a substantially larger active and effective filtering surface area for a given volume.

In the described embodiment, use of a vacuum has been disclosed for forcing the impure electrolytic sodium through the filter element. Though such a procedure represents a preferred embodiment, it will be obvious to those skilled in the art that other means may be used for such a purpose, an example of which is the application of sufficient pressure on the sodium in tank 10 by means of the inert gas introduced through line 15.

Still another advantage of the present invention is that, by maintaining filter units 37 in vertical spaced-apart relationship, sludge that may tend to accumulate on the porous metal filter surfaces falls away from such surfaces before a filter cake is formed to the extent sufficient to markedly effect filtering efficiency or bridging of sludge between the spaced-apart secondary filtering surfaces in the novel filter structure embodied herein.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A filter apparatus, adapted for filtering light liquid metals, comprising a metal screen filter means closed at its top end and open at its oppositely disposed end, said metal screen being adapted to initially filter particles from a light liquid metal passed through said metal screen whereby partially purified liquid metal passes into the interior of said filter means, a secondary filter means disposed inside of said metal screen, said secondary filter means having a closed bottom and closed top and disposed in said metal screen with the closed bottom of said secondary filter means being disposed inside of the open end portion of said metal screen and the closed top of said secondary filter means being disposed inside the closed end portion of said metal screen, a conduit means extending through the closed top of said secondary filter means and in open communication with the interior of said secondary filter means, said conduit means providing a confined passage from the interior of said secondary filter means to outside of said metal screen filter means, said secondary filter means being adapted to filter particles from said partially purified liquid metal whereby purified liquid metal passes into the interior of said secondary filter means and particles that pass through said metal screen and are filtered out by said secondary filter means pass out of said apparatus through the open end portion of said metal screen.

2. A filter apparatus, adapted for filtering liquid light metals, comprising a vertically elongated primary filter means comprising substantially circumferentially disposed vertical spaced-apart support means covered with a metal screen, said primary filter means having an open bottom and a closed top and adapted to initially filter particles from a liquid light metal forced through said screen whereby partially purified light liquid metal passes into the interior of said primary filter means, a secondary filter means disposed inside of said primary filter means and spaced-away from the inner surface of said metal screen, said secondary filter means having a closed bottom and a closed top portion and disposed inside of said primary filter means such that the closed top portion of said secondary means is inside the closed top portion of the primary means and the opposite end portion of said secondary means is inside the open bottom portion of said primary means, said secondary filter means being adapted to filter particles from said partially purified liquid metal whereby purified liquid metal passes into the interior of said secondary means and particles that pass through said primary means and are filtered out by said secondary means pass out of said apparatus through the open bottom of said primary means, and conduit means extending through the closed top of said secondary filter means and in open communication with the interior of said secondary filter means providing a confined passage for liquid metal from the interior of said secondary means to outside of said primary filter means.

3. A filter apparatus, as defined in claim 2, wherein the secondary filter means comprises a vertically elongated porous metal filter.

4. A filter apparatus, as defined in claim 2, wherein the secondary filter means comprises a plurality of vertically elongated, spaced-apart filter elements, each of said elements having a closed bottom and a closed top, an opening in the top of each of said secondary filter elements, conduit means extending through the top of each of said secondary filter means and in open communication with the interior of said secondary filter means, said conduit means providing a confined passage for liquid from the interior of said secondary filter means, a common manifold for each of said conduit means, said common manifold being disposed above said secondary filter means and inside of said primary filter, and a conduit means in open communication with the interior of said manifold providing a confined passage for liquid from the interior of said manifold to outside of said primary filter means.

References Cited in the file of this patent

UNITED STATES PATENTS

| | | |
|---|---|---|
| 1,943,307 | Gilbert | Jan. 16, 1934 |
| 2,108,798 | Dalrymple | Feb. 22, 1938 |
| 2,359,386 | Reinsch | Oct. 3, 1944 |

FOREIGN PATENTS

| | | |
|---|---|---|
| 381,806 | Great Britain | Oct. 13, 1932 |
| 545,480 | Great Britain | May 28, 1942 |